US008578441B2

(12) United States Patent
Giles et al.

(10) Patent No.: US 8,578,441 B2
(45) Date of Patent: Nov. 5, 2013

(54) ENFORCING NETWORK SECURITY POLICIES WITH PACKET LABELS

(75) Inventors: Vincent Giles, Grenoble (FR); Brian Jemes, Moscow, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2804 days.

(21) Appl. No.: 10/896,676

(22) Filed: Jul. 22, 2004

(65) Prior Publication Data

US 2006/0021001 A1 Jan. 26, 2006

(51) Int. Cl.
*H04L 29/06* (2006.01)
(52) U.S. Cl.
USPC .................................. 726/1; 726/23
(58) Field of Classification Search
USPC ........................................ 726/1, 23
See application file for complete search history.

(56) References Cited

U.S. PATENT DOCUMENTS

| 5,850,515 | A | * | 12/1998 | Lo et al. ......................... 714/43 |
| 2002/0099823 | A1 | | 7/2002 | Jemes et al. |
| 2004/0093521 | A1 | * | 5/2004 | Hamadeh et al. ............. 713/201 |

FOREIGN PATENT DOCUMENTS

| EP | 0 909 073 A2 | 4/1999 |
| JP | 2002-101126 | 4/2002 |
| JP | 2003-018156 | 1/2003 |
| JP | 2003-258857 | 9/2003 |
| JP | 2003-333077 | 11/2003 |

OTHER PUBLICATIONS

Lee, Hyung-Woo, "Advanced Packet Marking Mechanism with Pushback for IP Traceback", Applied Cryptography and Network Security, Lecture Notes in Computer Science, vol. 3089/2004, pp. 426-438.*
Lee, H.C.J.; Miao Ma; Thing, V.L.L.; Yi Xu, "On the issues of IP traceback for IPv6 and mobile IPv6", Computers and Communication, 2003. (ISCC 2003). Proceedings. Eighth IEEE International Symposium on, vol., Iss., Jun. 30-Jul. 3, 2003, pp. 582-587, vol. 1.*
Sailer, et al., "History Based Distributed Filtering—a Tagging Approach to Newtork-Level Access Control", Computer Security Applications, 2000. Document No. XP010529835.
Housley Xerox Special Information Systems R: "Security Label Framework for the Internet", IETF Standard, Internet Engineering Task Force, IETF, CH, May 1993 (pp. 1-14).

* cited by examiner

*Primary Examiner* — Yogesh Paliwal

(57) ABSTRACT

A secured network is disclosed configured to carry data, comprising a plurality of network bubbles and a plurality of network control points, wherein each network bubble comprises one or more bubble partitions and each bubble partition comprises at least one networked device configured to transmit and receive data, and all of the network devices corresponding to at least one of the plurality of network bubbles have a common network security policy. At least one network control point, such as a router, is provided with a marker module arranged to mark outgoing packets with a label corresponding to the network bubble from which the packets originate that can be used to enforce the network security policy of the at least one network bubble.

35 Claims, 2 Drawing Sheets

ENFORCING NETWORK SECURITY POLICIES WITH PACKET LABELS

FIELD OF THE INVENTION

The invention relates in general to computer networks, and more particularly, to a method and apparatus for implementing network security policy control in a network infrastructure.

BACKGROUND OF THE INVENTION

Enterprise data networks are vulnerable to numerous network attacks. Network firewalls or similar approaches are deployed as a common business practice to mitigate the risk of such attacks. Typically these security measures allow for unrestricted connectivity within the company or among a known collection of host devices, but they restrict access from public networks and other organizations or unknown devices. For example, the company may allow employees to access any web site on the public Internet, but prohibit access to confidential internal web sites by unknown users from public networks.

One commonly known device that performs network firewall functions is a router, which is a device that determines the next network point to which a packet of information is to be delivered. Before the packet is forwarded to another device, the router may use an access list that provides conditions or rules to determine whether the packet has access to the particular destination. In addition, these devices may provide functions such as user authentication. Also, application proxies, e.g., socks and caching web proxies, allow specific applications to be executed for network security and might also employ user authentication. Companies typically have network security policies that describe the type of access that should be permitted through firewall devices. This policy is achieved through the application of a combination of the network firewall devices described above.

Applicants U.S. Patent Applications U.S. 2001/0042213, U.S. 2002/0099823, U.S. 2002/0066030 and U.S. 2001/0037384, the contents of which are herein incorporated in their entirety by reference, describe various aspects of a partitioned network in which a security policy may be implemented by configuration of a plurality of network control points using replicated or at least matched sets of access control lists to provide a highly configurable set of security domains. This type of network will be referred to herein as implementing a Network Bubble Architecture.

In many of the embodiments envisaged by these patent applications, source and destination IP addresses are used to allow or restrict traffic passing through the network control points. Each bubble partition includes access lists describing inbound rules and outbound rules for hosts within it. A bubble registry manages the content and distribution of the network control point access lists to the network control points.

Whilst this approach is generally satisfactory, its implementation in existing networks having a pre-existing IP addressing plan can in practice lead to large access control list sizes because the bubble partitions may be defined by a set of disjoint IP address sub-ranges which each have to be separately specified in the access control lists. On the other hand, modifying the IP address plan so that contiguous address ranges map to the bubble partitions in a simpler manner may be an expensive exercise.

This invention is directed to mitigating the above drawbacks associated with the heretofore proposed approaches to implementing the Network Bubble Architecture and to facilitate its implementation in infrastructures having a preexisting IP address plan.

SUMMARY OF THE INVENTION

In brief, to achieve this, the invention provides a secured network configured to carry data, comprising a plurality of network bubbles and a plurality of network control points, wherein each network bubble comprises one or more bubble partitions and each bubble partition comprises at least one networked device configured to transmit and receive data, and all of the network devices corresponding to at least one of the plurality of network bubbles have a common network security policy. At least one network control point is provided with a marker module arranged to mark outgoing packets with a label corresponding to the network bubble from which the packets originate that can be used to enforce the network security policy of the at least one network bubble.

Another one of the network control point devices can then be arranged to apply the network security policy of the at least one network bubble to incoming packets based on the value of the label within said incoming packets.

In preferred embodiments, the label to be applied to a packet is determined according to which interface of a network control point device, such as a router, a outgoing packet is received from.

The plurality of network control points can be coupled to one another via a trusted backbone that is trusted not to permit modification of the labels applied to packets in transit.

The marking is applied, for instance, to the ToS byte of an IPV4 packet or to the flow label of an IPV6 packet.

In another aspect, the invention provides a method of operating a plurality of network control points to secure a network having a plurality of bubbles where each bubble has a plurality of bubble partitions and a plurality of network control points configured to connect the plurality of bubble partitions, the method comprising: marking outgoing packets with a label corresponding to the network bubble from which the packets originate; and applying a security policy for incoming packets based on the value of the label in the incoming packets.

In a further aspect, a network control point device, such as a router, is provided for use in secured network configured to carry data, the network comprising a plurality of network bubbles and a plurality of network control points, the network control point device comprising a marker module arranged to mark outgoing packets with a label corresponding to the network bubble from which the packets originate that can be used to enforce the network security policy of the network bubbles and a marking table linking a label to each bubble.

BRIEF DESCRIPTION OF THE DRAWINGS

An embodiment of the invention will now be described with reference to the accompanying drawings, wherein:

FIG. 3 is a partial block diagram of a network packet corresponding to the Internet Protocol version 4;

DESCRIPTION OF AN EMBODIMENT OF THE INVENTION

Figure 1:
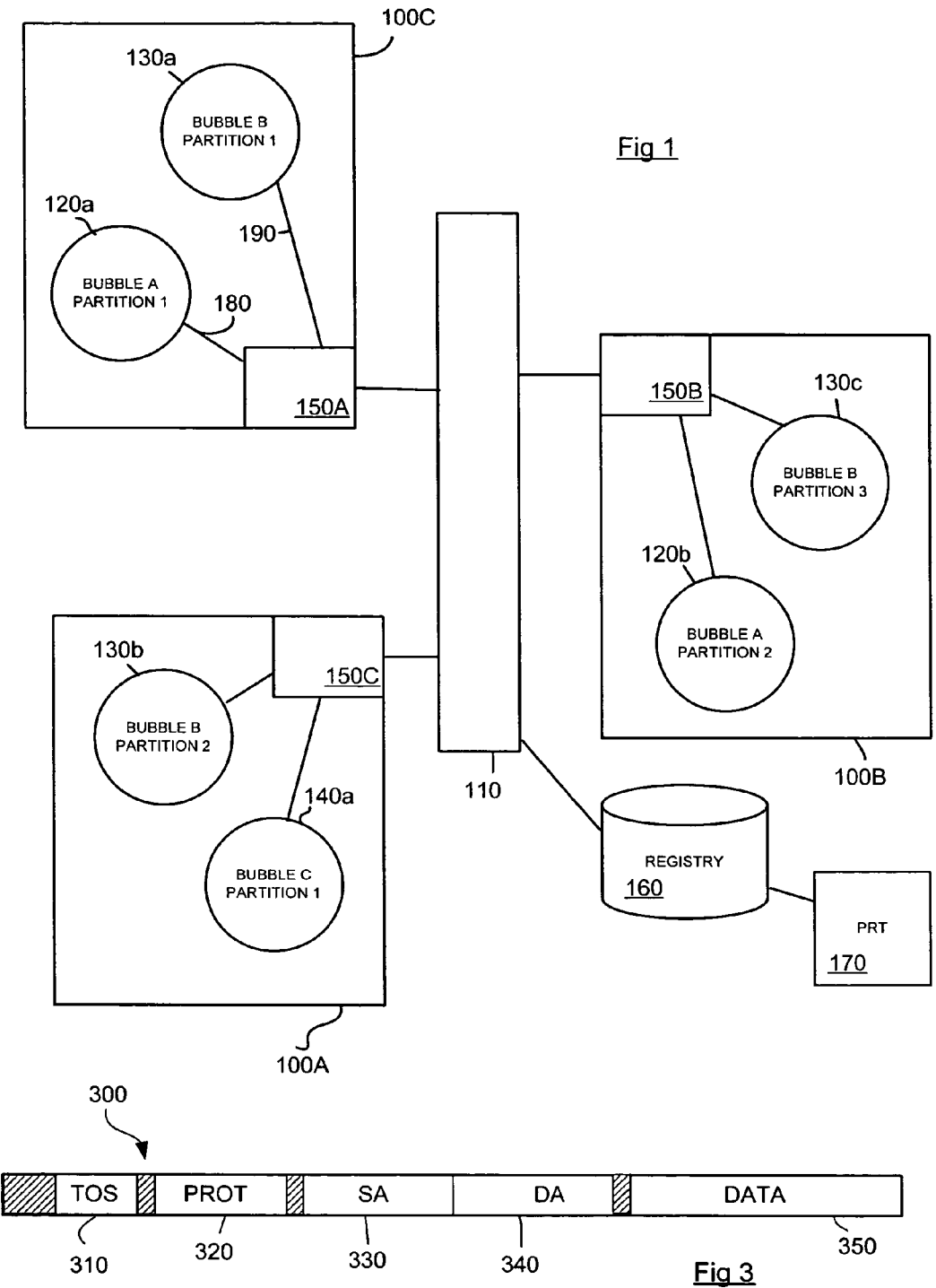
FIG. 1 is a schematic diagram illustrating a network architecture.

FIG. 1 is a schematic diagram illustrating a simple Network Bubble Architecture. In summary, in such architectures, network bubbles such as bubbles A, B, C and virtual backbone 110 represent compartmentalized, geographically distributed network environments. Each bubble is made up of one or more networks that will be referred to as bubble partitions 120a, 120b, 130a, 130b, 130c, 140a, each at a single physical location, and each with a physical connection to a trusted backbone (TB) 110 (itself a bubble), interconnecting the bubble partitions. In the schematic example of FIG. 1, Bubble A is shown as being made up of bubble partitions 120a and 120b on geographically separate campuses 100C and 100B; Bubble B is made up of bubble partitions 130a, 130b and 130c distributed across campuses 100A, 100B and 100C and bubble C is made up of bubble partition 140a on campus 100A only.

Each bubble has a boundary that separates it from all other bubbles. The boundary is implemented by network control points 150A, 150B, and 150C to which each bubble partition is connected through an interface, such as interface 180. The network control points act as security policy enforcement points by filtering network traffic travelling into and labelling traffic flowing out of the bubble partition, in the manner to be described below, such that a uniform security policy, that comprises a set of rules common to each partition of the bubble, is implemented across each bubble.

Figure 2:
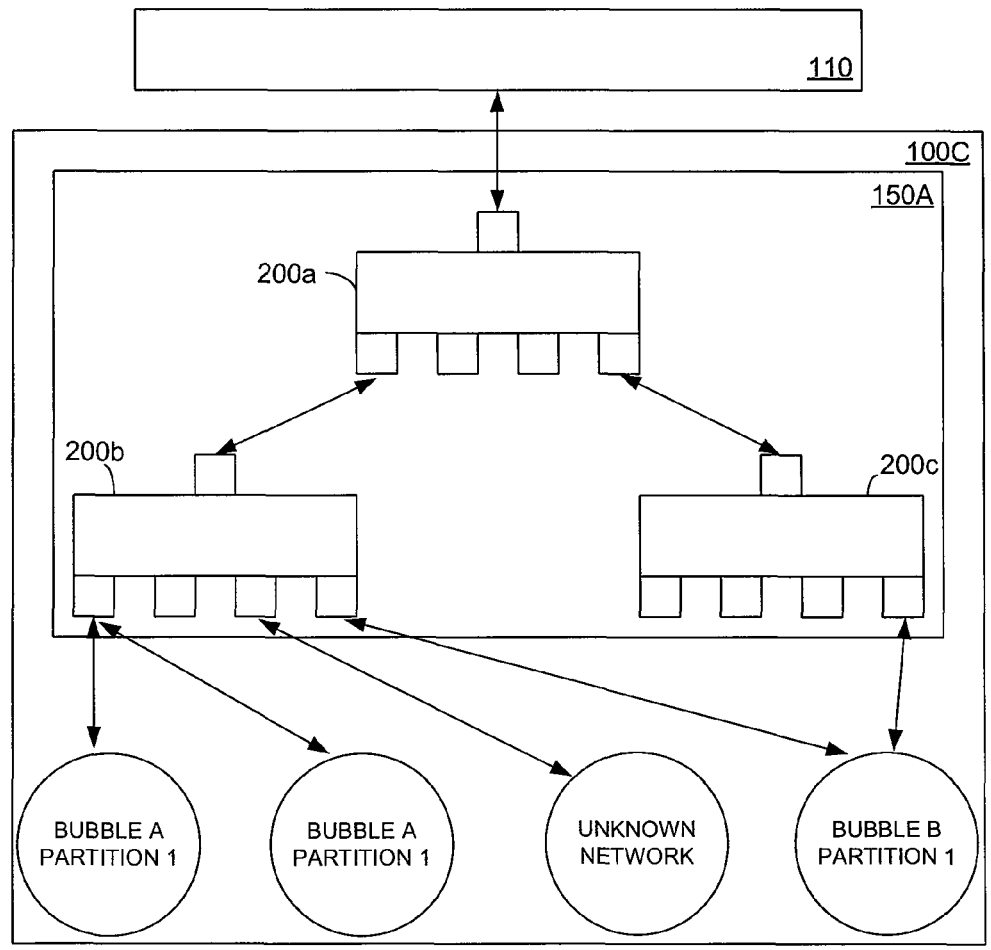
FIG. 2 is a schematic diagram illustrating a network control point.

FIG. 2 is a schematic diagram showing NCP 150A in more detail.

Each network control point, such as NCP 150A includes one or more network control point devices, which are used to connect one or more of the plurality of bubble partitions to the TB 110. NCP 150A is shown in FIG. 2 as comprising, for the purposes of example only, 3 network control point devices 200a, 200b and 200c.

Depending on the type of networks, routing, and security policy requirements, the network control point devices may be routers with access lists, dedicated network firewall devices, or any appropriate device capable of enforcing source integrity, network security policy, and routing functions. A combination of devices performing these functions may also be used to achieve the desired functionality. By way of example, in the case of an Internet protocol (IP) network, the network control point device might be a router, or a dedicated network firewall device. In the case of a wireless network, the network control point device can include a wireless access point connected to a device to route data. The network control point device might implement an access list to enforce the network security policies.

The example configuration of FIG. 2 shows Partition 1 of bubble A 120a as comprising 2 sets of hosts each connected to a single interface 180 of network control point device 200b and Partition 1 of Bubble B as being connected both to network control point device 200b and to network control point device 200c through 2 interfaces illustrated at 190. Also shown in FIG. 2 is a further partition 195 (not shown in FIG. 1) connected to another interface 210 of network control point device 200b and corresponding to a network that is unknown or untrusted for whatever reason. Network control point device 200a is connected to TB 110.

The trusted backbone 110 is a network, or collection of networks, that connects to a plurality of network control points 150 and that is trusted not to modify the network packets transiting it as described below. The trusted backbone 110 can be implemented using any suitable underlying technology, for example using one or more of the following: communication lines, e.g., T1, DS3, OC-3, an Internet service provider (ISP), a VPN, e.g., IPsec, a private network, switched and permanent virtual circuit network transmission technologies, e.g., frame relay and asynchronous transfer mode, multi-access transmission technologies, e.g., switched multimegabit data service, or any other wired or wireless network or a combination of these. The trusted backbone 110 is outside the network control points 150 and is external to all of the bubble partitions. The bubble partitions themselves are not part of the trusted backbone 110 and they utilize separate real or virtual equipment for LAN and WAN infrastructure that is contained entirely within their bounds. This allows for a consistent network security policy for each bubble partition that may be managed and maintained independently of the backbone that is used to interconnect network control points. A trusted backbone as described herein may also have the characteristics of a virtual backbone as described in Applicants U.S. patent application US2001/0037384 such as enforcement of source address integrity, but is not required to do so.

An enterprise may typically have one trusted backbone 110 linking geographically separate sites, and service providers, such as ISPs, may have one or more trusted backbones depending upon the needs of their customers and the networking requirements imposed by their customer's needs. The number of trusted backbones has no bearing on the operation of the resulting network. Also, one trusted backbone can be connected to another trusted backbone to increase the total number of bubble partitions available for access.

In this embodiment, hosts within a single bubble are assumed to be allowed full network access to each other, although other configurations are possible. Network access from one bubble instance to another bubble instance will therefore always cross two bubble boundaries, and may or may not be allowed depending on the security policy of those two bubbles.

One key advantage of the above architecture is that bubble types can be defined and standard security policies defined for the bubble types. Each bubble can then be identified as an instance of a bubble type. Each bubble instance can be initially implemented with a default access policy determined by its bubble type. Preferably, every possible IP address is assigned to a bubble instance and every bubble instance is ascribed to a bubble type, including the bubble type "unknown".

To illustrate the application and usefulness of these concepts, several different, but useful, bubble types, which are intended to be composed of devices that have similar network connectivity requirements, similar application and host security concerns, will now be briefly described.

First, an office automation bubble type might be defined so that an enterprise may, for instance, implement one single worldwide instance of this bubble type that will be the default network environment for its workers.

The office automation bubble type might, for instance, require a high level of authentication at the bubble boundary for inbound traffic.

The Internet might be identified as a bubble instance that contains all the IP address space not specifically assigned to any other bubble instance.

An "e-services" bubble type might require a more permissive bubble boundary for inbound access from anywhere on the Internet. This could be the default environment for containing external facing web and Internet application servers, for instance.

Whilst an enterprise may have only one, or at least a relatively small number of office automation bubble instances, it may need to implement several different "e-services" bubble instances to support a variety of Internet-facing applications and data stores with a high degree of compartmentalization.

Further bubble types might be defined as a default environment for internally used production application servers and many other data center systems, such as manufacturing lines, application development systems, etc.

Infrastructure bubble types may also be defined to support the IT infrastructure itself. Such "infrastructure" bubbles are different from other types in that infrastructure bubble instances may need to impose inbound and outbound bubble boundary access permissions (or restrictions) on bubble instances of other bubble types.

For example, a DNS bubble type might be defined to define the inbound and outbound access needed by the DNS bubble boundary, but also defines the inbound access needed by hosts within other bubble instances in order to allow the DNS service to operate correctly. A single instance of this bubble type might contain the authoritative DNS servers for a particular domain name space. Bubble instances of this type may also contain DHCP and NTP servers, for instance.

One advantage of the above-described architecture is that the infrastructure may comprise a central bubble registry 160 which is a database containing a description of the network security policy of the enterprise, the network firewall rule configuration, and the business and operational processes associated with the administration of the network security policy. The contents of the registry can be managed via a suitably arranged policy registration tool 170.

In the preferred embodiment, each bubble partition is associated with an access control list (ACL) describing inbound rules for hosts within it and a set of outbound marking rules for network packets transmitted from the bubble partition. In preferred embodiments, the bubble registry 160 generates the access control lists for the different bubble types based on a set of policy templates and distributes the access control lists to the network control points. The distribution may be directly to the network control points, or it may be indirectly through a device management system or configuration management server (not shown), which in turn applies the specific access list to the device. It will be understood however that the ACLs and marking rules may also, in other embodiments, be configured manually at the NCPs or any combination of automatic and manual configuration may be adopted.

In preferred embodiments, the content of the access control lists is divided into two rule groups or sections, —an inbound local rule group and an inbound remote rule group. The purpose of the rule groups is to allow the policies for the bubble to be completely specified and controlled across the network control points, and to ensure consistency in the implementation of the network security policy of the bubble in different network control points.

The inbound local rule group includes rules that enforce the access control on what data are allowed to enter the bubble partition. The inbound remote rule group includes rules that enforce inbound local rules on other bubble boundaries. Inbound remote rule groups are used by those infrastructure bubbles that need them. Outbound marking rules are also provided for marking the packets that exit the partitions as described below.

FIG. 3 is a partial block diagram of a network packet 300 corresponding to the Internet Protocol version 4. Packet 300 includes a Type of Service (TOS) byte 310, a protocol field 320, an IP source address (SA) field 330, an IP destination address (DA) field 340 and a data field 350. As described below, part of the TOS byte 310 can be used to carry a Bubble Label Value (BLV) that is used to link a bubble instance to a value of the BLV, for example:

| | |
|---|---|
| BubbleA = | BLV1 |
| BubbleB = | BLV2 |
| ... | |
| Bubblei = | BLVi |
| ... | |
| unlabeled = | BLVz |

There can be defined at least one special BLV which will indicate that the data packet is "unlabeled" in other words its source is unknown or untrusted, which is BLVz in the example above.

For example, in IPv4, if the BLV is carried in the IP header TOS byte, the BLV can be implemented with TOS bits 3-6, that is the bits delay, throughput, reliability and cost. This particular choice has the advantage of allowing QoS management to be carried out using the IP precedence bits, that is TOS bits 0-2. In this example, using 4 bits for the BLV gives a total of 16 possible BLVs. However, it will be understood that this limitation of scale may in practice be sufficient for many modern enterprise IT infrastructures. The BLV of 15 may be used as the special "Unlabeled" label, for instance. In this case, every labelled network bubble instance will be given a unique BLV from 0 to 14.

However, many other arrangements are possible, for instance if QoS management is not required the DSCP field may then be used, allowing up to 64 BLVs.

Another example would be an implementation for IPv6. The BLV could conveniently be carried in the flow label field. The BLV of 1,048,575 may be the special "Unlabeled" label. Every labelled network bubble may be given a unique BLV from 0 to 1,048,574. Such an implementation of BLC will be limited to a maximum of 1,048,574 labelled network bubbles.

The access control lists in the network control points control incoming traffic based on any combination of header values in conjunction with the BLV.

Figure 4:
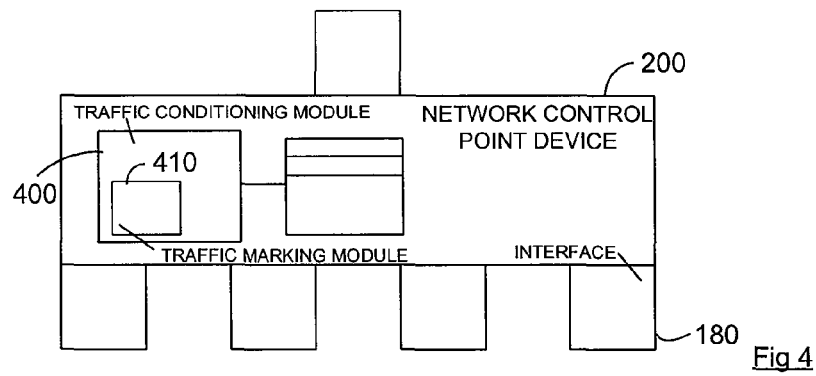
FIG. 4 shows a partial schematic view illustrating network control point device.

The BLV is assigned based on the source network bubble partition, so the NCPs 150A, 150B, 150C, are arranged to set the Bubble Label Value (BLV) in each data packet leaving a bubble partition to the value associated with the network bubble of the source network bubble partition. FIG. 4 shows a partial schematic view of a network control point device, such as network control point devices 200a, 200b or 200c. Network control point device 200 comprises a traffic conditioning module 400 that includes a traffic marking module 410. Traffic marking module 410 has access to a local marking access list linking the interfaces of the network control point device to BLV values corresponding to the network bubble instances. Traffic marking module 410 serves to set the BLV of each packet traversing the network control module 200 with the BLV corresponding to the interface upon which the packet was received. Traffic received on any interface not associated with a BLV is marked with the BLV corresponding to an unknown or untrusted partition, such as partition 195 shown in FIG. 2. Traffic marked with the BLV corresponding to an unknown or untrusted partition may be checked in some other way on entry to a bubble partition, such as by using the source and destination addresses, or may simply be discarded.

The use of the BLV corresponding to the unknown or untrusted partition allows some unknown bubble partitions can connect to the TB 110 without an NCP as long as traffic coming from such partitions is marked with the value BLVz corresponding to an unknown or untrusted partition. This is useful since it represents a possible implementation of a bubble network architecture in a legacy network.

It is preferable that marking of the packets take place in the devices, such as routers, such as devices 200b and 200c at the edge of the network. A core network control point device, such as network control device 200a that has interfaces connected to other network control devices would then be arranged not to modify the BL value of traffic arriving on those interfaces.

For example, in the network illustrated in FIG. 1 NCP 150A associates interface 180 with Bubble B and therefore is arranged to set the BLV of any packets arriving on that interface with the BLV for bubble B. The BLV is carried in the data packet to the destination bubble instance and is assumed not to be changed by any intermediate nodes within the virtual backbone 100. This allows the other NCPs within the system to filter the traffic they receive based on a local inbound rule group applying to this traffic. In other words, an NCP forwarding a data packet to a directly connected destination network bubble partition will apply the inbound network bubble boundary policy to each data packet that it forwards to the directly connected network bubble partition. That inbound bubble boundary policy is arranged to use the BLV to apply specific policy entries to specific source network bubble instances corresponding to the value of the BL field.

A template for an instance of a bubble contains information for creation of the access lists controlling the flow of traffic into a bubble partition. These are the local inbound access lists. Due to the BLV being set at the source partition of the packet, controlling the flow out of a partition is not necessary since the NCP through which the other bubble partitions are attached to the trusted backbone 110 will control flow into those bubble partitions.

It will be understood that access control lists based on source and destination IP addresses may be used in conjunction with access control lists based on the BLV as described above in a very flexible way. For instance, in some configurations it may be desirable to allow traffic with a particular source address to enter a given partition, despite it carrying a BLV that is otherwise denied or it may be necessary to use access control lists based on source and destination addresses for portions of a network where traffic cannot be marked with a BLV, in a transition situation in a legacy network, for instance.

The term "trusted backbone," unless otherwise specified, is intended to refer to a network backbone that connects a plurality of bubbles, or networks with network control points or without, having the property that the BLV is not modified in transit.

The foregoing detailed description of the present invention is provided for the purposes of illustration and is not intended to be exhaustive or to limit the invention to the precise embodiments disclosed. Embodiments of the invention may provide different capabilities and benefits depending on the configuration used to implement the system. Accordingly, the scope of the present invention is defined by the following claims.

The invention claimed is:

1. A secured network configured to carry data, comprising a plurality of network bubbles and a plurality of network control points,
   wherein each said network bubble comprises one or more bubble partitions and each said bubble partition comprises at least one networked device configured to transmit and receive data, and all of the network devices corresponding to at least one of the plurality of network bubbles have a common network security policy,
   wherein at least one network control point is provided with a marker module arranged to mark outgoing packets with a label corresponding to the network bubble from which the packets originate that can be used to enforce the network security policy of the at least one network bubble.

2. A secured network as claimed in claim 1 wherein at least one of the network control point devices is arranged to apply the network security policy of the at least one network bubble to incoming packets based on a value of the label within said incoming packets.

3. A secured network as claimed in claim 1, wherein the at least one network control point includes one or more network control point devices having at least one interface, wherein the label to be applied to a packet is determined according to which interface of the network control point device a outgoing packet is received from.

4. A secured network as claimed in claim 3, wherein the network control point device is a router.

5. A secured network as claimed in claim 1, wherein the plurality of network control points are coupled to one another via a trusted backbone that is trusted not to permit modification of the labels applied to packets in transit.

6. A secured network as claimed in claim 1 wherein each said bubble has a corresponding label value.

7. A secured network as claimed in claim 1 wherein a label value is reserved for packets from unknown or untrusted sources.

8. A secured network as claimed in claim 1 wherein the marking is applied to a ToS byte of an IPV4 packet.

9. A secured network as claimed in claim 1 wherein the marking is applied to delay, throughput, reliability and cost bits of a ToS byte of an IPV4 packet.

10. A secured network as claimed in claim 1 wherein the marking is applied to the flow label of an IPV6 packet.

11. A secured network as claimed in claim 1 wherein the network control point is arranged to enforce source address integrity.

12. A method of operating a plurality of network control points to secure a network having a plurality of bubbles where each said bubble has a plurality of bubble partitions and a plurality of network control points configured to connect the plurality of bubble partitions, the method comprising:
   marking outgoing packets with a label corresponding to the network bubble from which the packets originate; and
   applying a security policy for incoming packets based on a value of the label in the incoming packets.

13. A method as claimed in claim 12, wherein network control point includes one or more network control point devices having at least one interface, wherein the label to be applied to a packet is determined according to which interface of the network control point device a outgoing packet is received from.

14. A method as claimed in claim 12 wherein the network control point device is an router.

15. A method as claimed in claim 12, comprising trusting a backbone interconnecting the network control points not to permit modification of the labels applied to packets in transit.

16. A method as claimed in claim 12 comprising assigning a label value to each said bubble.

17. A method as claimed in claim 12 comprising reserving a label value for packets from unknown or untrusted sources.

18. A method as claimed in claim 12 wherein the marking is applied to a ToS byte of an IPV4 packet.

19. A method as claimed in claim 12 wherein the marking is applied to delay, throughput, reliability and cost bits of a ToS byte of an IPV4 packet.

20. A method as claimed in claim 12 wherein the marking is applied to the flow label of an IPV6 packet.

21. A network configured to carry data, comprising a plurality of network bubbles and a plurality of network control points coupled to one another via a backbone that is trusted not to permit modification of the packets in transit,
  wherein each said network bubble comprises one or more bubble partitions and each said bubble partition comprises at least one networked device configured to transmit and receive data, and all of the network devices corresponding to at least one of the plurality of network bubbles have a common network security policy,
  wherein each said bubble has a corresponding label value and at least one network control point is provided with a marker module arranged to mark outgoing packets with a label corresponding to the network bubble from which the packets originate that can be used to enforce the network security policy of the at least one network bubble and wherein at least another of the network control point devices is arranged to apply the network security policy of the at least one network bubble to incoming packets based on a value of the label within incoming packets.

22. A network as claimed in claim 21, wherein the at least one network control point includes one or more network control point devices having at least one interface, wherein the label to be applied to a packet is determined according to which interface of the network control point device a outgoing packet is received from.

23. A network as claimed in claim 22, wherein the network control point device is a router.

24. A network as claimed in claim 23 wherein a label value is reserved for packets from unknown or untrusted sources.

25. A network as claimed in claim 23 wherein the marking is applied to a ToS byte of an IPV4 packet.

26. A network as claimed in claim 23 wherein the marking is applied to delay, throughput, reliability and cost bits of a ToS byte of an IPV4 packet.

27. A network as claimed in claim 21 wherein the marking is applied to the flow label of an IPV6 packet.

28. A network control point device for use in secured network configured to carry data, the network comprising a plurality of network bubbles and a plurality of network control points, the network control point device comprising a marker module arranged to mark outgoing packets with a label corresponding to the network bubble from which the packets originate that can be used to enforce the network security policy of the network bubbles and a marking table linking a label to each said bubble.

29. A network control point device as claimed in claim 28 arranged to apply the network security policy of at least one network bubble to incoming packets based on a value of the label within said incoming packets.

30. A network control point device as claimed in claim 28, wherein the label to be applied to a packet is determined according to which interface of the network control point device a outgoing packet is received from.

31. A network control point device as claimed in claim 28 wherein the network control point device is a router.

32. A network control point device as claimed in claim 28 wherein the marking is applied to a ToS byte of an IPV4 packet.

33. A network control point device as claimed in claim 28 wherein the marking is applied to delay, throughput, reliability and cost bits of a ToS byte of an IPV4 packet.

34. A network control point device as claimed in claim 28 wherein the marking is applied to the flow label of an IPV6 packet.

35. A network control point device as claimed in claim 28 arranged to enforce source address integrity.

* * * * *